US011867430B2

(12) United States Patent
Everly et al.

(10) Patent No.: US 11,867,430 B2
(45) Date of Patent: Jan. 9, 2024

(54) HEATER BUNDLE FOR ADAPTIVE CONTROL AND METHOD OF REDUCING CURRENT LEAKAGE

(71) Applicant: Watlow Electric Manufacturing Company, St. Louis, MO (US)

(72) Inventors: Mark D. Everly, St. Charles, MO (US); Michael W. Ruhr, St. Louis, MO (US); Louis P. Steinhauser, St. Louis, MO (US); Mark L. G. Hoven, St. Louis, MO (US); Richard T. Williams, Genoa City, WI (US)

(73) Assignee: WATLOW ELECTRIC MANUFACTURING COMPANY, St. Louis, MO (US)

( * ) Notice: Subject to any disclaimer, the term of this patent is extended or adjusted under 35 U.S.C. 154(b) by 948 days.

(21) Appl. No.: 16/841,171

(22) Filed: Apr. 6, 2020

(65) Prior Publication Data

US 2020/0232677 A1 Jul. 23, 2020

Related U.S. Application Data

(60) Division of application No. 15/204,672, filed on Jul. 7, 2016, now Pat. No. 10,619,888, which is a (Continued)

(51) Int. Cl.

*F24H 9/20* (2022.01)
*F24H 1/10* (2022.01)

(Continued)

(52) U.S. Cl.

CPC ........... *F24H 9/2028* (2013.01); *F24H 1/103* (2013.01); *F24H 15/124* (2022.01);

(Continued)

(58) Field of Classification Search

None

See application file for complete search history.

(56) References Cited

U.S. PATENT DOCUMENTS 710,429 A * 10/1902 Collins et al. ....... A61N 1/0492 307/132 R
2,498,054 A * 2/1950 Taylor .................. H05B 1/0277 219/486

(Continued)

FOREIGN PATENT DOCUMENTS

CN 101142852 3/2008
CN 100380064 C 4/2008

(Continued)

OTHER PUBLICATIONS

European Search Report issued in corresponding EP Application 20182945, completed Oct. 13, 2020.

(Continued)

*Primary Examiner* — Thor S Campbell
(74) *Attorney, Agent, or Firm* — Burris Law, PLLC

(57) ABSTRACT

A heater system includes a heater bundle. The heater bundle includes a plurality of heater assemblies. Each heater assembly includes a plurality of heater units and an insulating material, and each heater unit defines at least one independently controlled heating zone. The heater bundle includes power conductors electrically connected to each of the independently controlled heating zones in each of the heater units. The heater bundle includes a power supply device configured to modulate power to each of the independently controlled heater zones of the heater units through the power conductors. A voltage is selectively supplied to each of the independently controlled heating zones such that a reduced number of independently controlled heating zones receives the voltage at a time or at least a subset of the independently (Continued)

controlled heating zones receive a reduced voltage at all times.

25 Claims, 5 Drawing Sheets

Related U.S. Application Data continuation-in-part of application No. 15/058,838, filed on Mar. 2, 2016, now Pat. No. 10,247,445.

(51) Int. Cl.

| | |
|---|---|
| ***H05B 3/48*** | (2006.01) |
| ***H05B 3/82*** | (2006.01) |
| ***H05B 3/04*** | (2006.01) |
| ***H05B 1/02*** | (2006.01) |
| ***F24H 15/37*** | (2022.01) |
| ***F24H 15/25*** | (2022.01) |
| ***F24H 15/124*** | (2022.01) |
| ***F24H 15/238*** | (2022.01) |
| *F24H 15/132* | (2022.01) |

(52) U.S. Cl.

CPC ........... *F24H 15/238* (2022.01); *F24H 15/37* (2022.01); *H05B 1/0283* (2013.01); *H05B 3/04* (2013.01); *H05B 3/48* (2013.01); *H05B 3/82* (2013.01); *F24H 15/132* (2022.01); *F24H 15/25* (2022.01); *H05B 2203/014* (2013.01)

(56) References Cited

U.S. PATENT DOCUMENTS

| | | | | | |
|---|---|---|---|---|---|
| 2,831,951 | A | | 4/1958 | Desloge | |
| 3,340,382 | A | * | 9/1967 | Lennox | H05B 3/82 219/544 |
| 3,582,616 | A | | 6/1971 | Wrob | |
| 3,873,807 | A | * | 3/1975 | Mohr | F24H 1/225 392/338 |
| 3,970,822 | A | | 7/1976 | Wrob | |
| 4,039,995 | A | | 8/1977 | Walton et al. | |
| 4,090,062 | A | * | 5/1978 | Phillips | H02J 3/14 219/486 |
| 4,132,262 | A | * | 1/1979 | Wibell | A47G 9/0215 165/206 |
| 4,908,498 | A | * | 3/1990 | Kivela | G05D 23/1917 219/486 |
| 5,023,430 | A | * | 6/1991 | Brekkestran | A41D 13/0051 219/486 |
| 5,105,067 | A | | 4/1992 | Brekkestran et al. | |
| 5,197,375 | A | * | 3/1993 | Rosenbrock | G05D 23/22 99/335 |
| 5,280,422 | A | | 1/1994 | Moe et al. | |
| 5,552,998 | A | * | 9/1996 | Datta | G05D 23/2401 700/286 |
| 5,831,250 | A | * | 11/1998 | Bradenbaugh | H05B 1/0283 219/494 |
| 6,363,216 | B1 | * | 3/2002 | Bradenbaugh | F24H 9/2021 219/441 |
| 6,374,046 | B1 | * | 4/2002 | Bradenbaugh | H05B 1/0283 219/492 |
| 6,566,633 | B2 | * | 5/2003 | Kitada | G05D 23/1934 219/486 |
| 7,372,007 | B1 | | 5/2008 | McClanahan et al. | |
| 8,219,258 | B1 | * | 7/2012 | Almeida | G05B 15/02 700/297 |
| 9,065,294 | B2 | * | 6/2015 | Kambara | H02J 13/00004 |
| 9,123,755 | B2 | | 9/2015 | Swanson et al. | |
| 9,123,756 | B2 | | 9/2015 | Schmidt et al. | |
| 9,177,840 | B2 | | 11/2015 | Swanson et al. | |
| 9,196,513 | B2 | | 11/2015 | Schmidt et al. | |
| 9,357,803 | B2 | * | 6/2016 | Egoyants | H05B 3/44 |
| 2002/0011480 | A1 | * | 1/2002 | Schilling | H05B 3/746 219/448.11 |
| 2004/0039487 | A1 | | 2/2004 | Fennewald et al. | |
| 2008/0083721 | A1 | | 4/2008 | Kaiserman et al. | |
| 2009/0001778 | A1 | * | 1/2009 | Nathan | H05B 3/34 297/180.12 |
| 2016/0016495 | A1 | | 1/2016 | Tüskes | |

FOREIGN PATENT DOCUMENTS

| | | | |
|---|---|---|---|
| CN | 102667360 | A | 9/2012 |
| CN | 103826482 | | 5/2014 |
| CN | 104025702 | | 9/2014 |
| CN | 105188167 | A | 12/2015 |
| EP | 3737206 | | 11/2020 |
| GB | 1063687 | A | 11/1981 |
| JP | 2014522650 | A | 9/2014 |
| JP | 2014525251 | A | 9/2014 |
| JP | 2015513922 | A | 5/2015 |
| KR | 2020140004692 | | 8/2014 |
| WO | 2004019143 | | 3/2004 |
| WO | 2013033402 | | 3/2013 |
| WO | 2013034456 | A1 | 3/2013 |
| WO | 2013034458 | | 3/2013 |
| WO | 2013034460 | A1 | 3/2013 |
| WO | 2013160112 | A2 | 10/2013 |

OTHER PUBLICATIONS

Office Action issued in corresponding JP Application No. 2022-038965, dated May 9, 2023, 4 pages.

* cited by examiner

HEATER BUNDLE FOR ADAPTIVE CONTROL AND METHOD OF REDUCING CURRENT LEAKAGE

CROSS-REFERENCE TO RELATED APPLICATIONS

This application is a divisional of U.S. patent application Ser. No. 15/204,672, filed on Jul. 7, 2016, which is a continuation-in-part of U.S. patent application Ser. No. 15/058,838, filed on Mar. 2, 2016, now U.S. Pat. No. 10,247,445. disclosures of the above applications are incorporated herein by reference.

FIELD

The present disclosure relates to electric heaters, and more particularly to heaters for heating a fluid flow such as heat exchangers and the control thereof.

BACKGROUND

The statements in this section merely provide background information related to the present disclosure and may not constitute prior art.

A fluid heater may be in the form of a cartridge heater, which has a rod configuration to heat fluid that flows along or past an exterior surface of the cartridge heater. The cartridge heater may be disposed inside a heat exchanger for heating the fluid flowing through the heat exchanger. If the cartridge heater is not properly sealed, moisture and fluid may enter the cartridge heater to contaminate the insulation material that electrically insulates a resistive heating element from the metal sheath of the cartridge heater, resulting in dielectric breakdown and consequently heater failure. The moisture can also cause short circuiting between power conductors and the outer metal sheath. The failure of the cartridge heater may cause costly downtime of the apparatus that uses the cartridge heater.

Further, during operation, some heaters may experience "current leakage," which is generally the flow of current through to a ground. The current leaks by way of insulation surrounding conductors in electrical heaters and this condition can cause a rise in voltage and over-heating.

SUMMARY

This section provides a general summary of the disclosure and is not a comprehensive disclosure of its full scope or all of its features.

In one form, the present disclosure includes a heater system includes a heater bundle. The heater bundle includes a plurality of heater assemblies. Each heater assembly includes a plurality of heater units and an insulating material, and each heater unit defines at least one independently controlled heating zone. The heater bundle includes power conductors electrically connected to each of the independently controlled heating zones in each of the heater units. The heater bundle includes a power supply device configured to modulate power to each of the independently controlled heater zones of the heater units through the power conductors. A voltage is selectively supplied to each of the independently controlled heating zones such that a reduced number of independently controlled heating zones receives the voltage at a time or at least a subset of the independently controlled heating zones receive a reduced voltage at all times.

In some forms, the voltage is selectively supplied via a variable transformer.

In some forms, at least one set of a power supply and a power return conductors include different materials such that a junction is formed between the different materials and a resistive heating element of a heater unit and is used to determine temperature of the independently controlled heating zones.

In some forms, a number of independently controlled heating zones is n, and a number of power supply and return conductors is n+1.

In some forms, an apparatus for heating fluid includes a sealed housing defining an internal chamber and having a fluid inlet and a fluid outlet. In some forms, the apparatus for heating the fluid includes a heater bundle disposed within the internal chamber of the sealed housing. The heater bundle includes a plurality of heater assemblies. Each heater assembly includes a plurality of heater units and an insulating material, and each heater unit defines at least one independently controlled heating zone. The heater bundle includes power conductors electrically connected to each of the independently controlled heating zones in each of the heater units. The heater bundle includes a power supply device configured to modulate power to each of the independently controlled heater zones of the heater units through the power conductors. A voltage is selectively supplied to each of the independently controlled heating zones such that a reduced number of independently controlled heating zones receives the voltage at a time or at least a subset of the independently controlled heating zones receive a reduced voltage at all times. In some forms, the heater bundle is adapted to provide a tailored heat distribution to a fluid within the sealed housing.

In some forms, the power supply device is configured to use a scaling factor for at least one of adjusting the modulating power, determining a magnitude of the voltage to be selectively supplied, and determining a duration for which the voltage is selectively supplied.

In some forms, the power supply device is configured to use the scaling factor as a function of at least one of a power dissipation capacity of at least one independently controlled heating zone, a maximum allowable temperature of at least one independently controlled heating zone, an exposed heating area of at least one independently controlled heating zone, a thermal behavior model of the heating system, characteristics of an environmental system producing fluid flow being heated by the heater system, a fluid flow rate across the heater assembly, an area of at least one independently controlled heating zone, electrical insulation resistance of at least one independently controlled heating zone, an electrical current leakage of at least one independently controlled heating zone, a circuit resistance of at least one independently controlled heating zone, a zone circuit EMF of at least one independently controlled heating zone, and a dielectric constant of at least one independently controlled heating zone.

In some forms, the scaling factor is a power limiting function that limits a value that is one of wattage, magnitude of voltage selectively supplied, and duration for which the voltage is selectively supplied to each heating zone to multiple values less than that produced at a full line voltage through the use of a scaling function, the scaling function being a ratio between a desired value and the full line voltage, wherein the power supply device is configured to provide a scaled output by multiplying a percentage output by the scaling function.

In some forms, the power supply device is configured to sequentially supply the voltage to predetermined geometric areas of the independently controlled heating zones.

In some forms, the power supply device is configured to sequentially supply the voltage to different heating zones based on a change in resistance of each heating zone.

In some forms, the power supply device is configured to turn off at least one independently controlled heating zone based on an anomalous condition, while the remaining independently controlled heating zones continue to receive the voltage selectively.

In some forms, the power supply device is configured to adjust a rate of successively supplying the voltage to each of the independently controlled heating zones based on an operational characteristic of at least one independently controlled heating zone.

In some forms, the operational characteristic is one of resistance, temperature, and change in resistance over time of at least one heating zone, a fluid flow rate across the heater assembly, an area of an independently controlled heating zone, electrical insulation resistance of at least one independently controlled heating zone, an electrical current leakage of at least one independently controlled heating zone, a circuit resistance of at least one independently controlled heating zone, a zone circuit EMF of at least one independently controlled heating zone, a dielectric constant of at least one independently controlled heating zone, and characteristics of an environmental system producing fluid flow being heated by the heater system.

The present disclosure provides a heater system that includes a heater assembly. The heater assembly includes a plurality of heater units and an insulating material, and each heater unit defines at least one independently controlled heating zone. The heater assembly includes power conductors electrically connected to each of the independently controlled heating zones in each of the heater units. The heater assembly includes a power supply device configured to modulate power to each of the independently controlled heater zones of the heater units through the power conductors. A voltage is selectively supplied to each of the independently controlled heating zones such that a reduced number of independently controlled heating zones receives the voltage at a time or at least a subset of the independently controlled heating zones receive a reduced voltage at all times.

In some forms, the voltage is selectively supplied via a variable transformer.

In some forms, at least one set of a power supply and a power return conductors include different materials such that a junction is formed between the different materials and a resistive heating element of a heater unit and is used to determine temperature of the independently controlled heating zones.

In some forms, a number of independently controlled heating zones is n, and a number of power supply and return conductors is n+1.

In some forms, the power supply device is configured to use a scaling factor for at least one of adjusting the modulating power, determining a magnitude of the voltage to be selectively supplied, and determining a duration for which the voltage is selectively supplied.

In some forms, the power supply device is configured to use the scaling factor as a function of at least one of a power dissipation capacity of at least one independently controlled heating zone, a maximum allowable temperature of at least one independently controlled heating zone, an exposed heating area of at least one independently controlled heating zone, a thermal behavior model of the heating system, characteristics of an environmental system producing fluid flow being heated by the heater system, a fluid flow rate across the heater assembly, an area of at least one independently controlled heating zone, electrical insulation resistance of at least one independently controlled heating zone, an electrical current leakage of at least one independently controlled heating zone, a circuit resistance of at least one independently controlled heating zone, a zone circuit EMF of at least one independently controlled heating zone, and a dielectric constant of at least one independently controlled heating zone.

In some forms, the scaling factor is a power limiting function that limits a value that is one of wattage, magnitude of voltage selectively supplied, and duration for which the voltage is selectively supplied to each heating zone to multiple values less than that produced at a full line voltage through the use of a scaling function, the scaling function being a ratio between a desired value and the full line voltage, wherein the power supply device is configured to provide a scaled output by multiplying a percentage output by the scaling function.

In some forms, the power supply device is configured to sequentially supply the voltage to predetermined geometric areas of the independently controlled heating zones.

In some forms, the power supply device is configured to sequentially supply the voltage to different heating zones based on a change in resistance of each heating zone.

In some forms, the power supply device is configured to turn off at least one independently controlled heating zone based on an anomalous condition, while the remaining independently controlled heating zones continue to receive the voltage selectively.

In some forms, the power supply device is configured to adjust a rate of successively supplying the voltage to each of the independently controlled heating zones based on an operational characteristic of at least one independently controlled heating zone.

In some forms, the operational characteristic is one of resistance, temperature, and change in resistance over time of at least one heating zone, a fluid flow rate across the heater assembly, an area of an independently controlled heating zone, electrical insulation resistance of at least one independently controlled heating zone, an electrical current leakage of at least one independently controlled heating zone, a circuit resistance of at least one independently controlled heating zone, a zone circuit EMF of at least one independently controlled heating zone, a dielectric constant of at least one independently controlled heating zone, and characteristics of an environmental system producing fluid flow being heated by the heater system.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
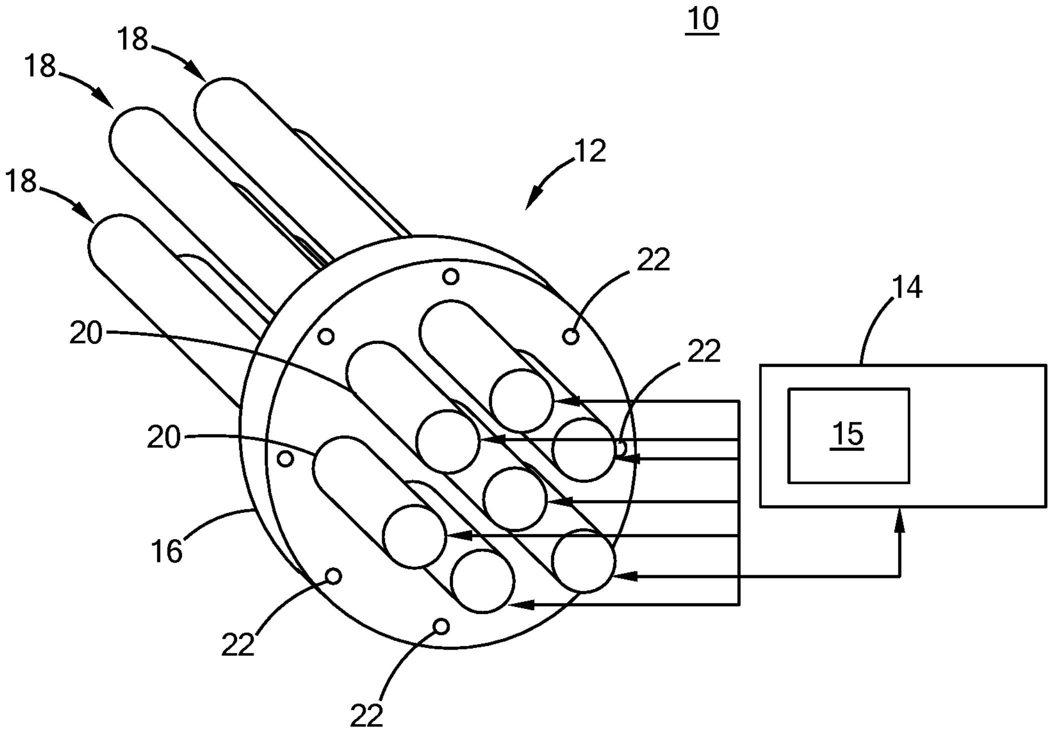
FIG. 1 is a perspective view of a heater bundle constructed in accordance with the teachings of the present disclosure.

Referring to FIG. 1, a heater system constructed in accordance with the teachings of the present disclosure is generally indicated by reference 10. The heater system 10 includes a heater bundle 12 and a power supply device 14 electrically connected to the heater bundle 12. The power supply device 14 includes a controller 15 for controlling power supply to the heater bundle 12. A "heater bundle", as used in the present disclosure, refers to a heater apparatus including two or more physically distinct heating devices that can be independently controlled. Therefore, when one of the heating devices in the heater bundle fails or degrades, the remaining heating devices in the heater bundle 12 can continue to operate.

In one form, the heater bundle 12 includes a mounting flange 16 and a plurality of heater assemblies 18 secured to the mounting flange 16. The mounting flange 16 includes a plurality of apertures 20 through which the heater assemblies 18 extend. Although the heater assemblies 18 are arranged to be parallel in this form, it should be understood that alternate positions/arrangements of the heater assemblies 18 are within the scope of the present disclosure.

As further shown, the mounting flange 16 includes a plurality of mounting holes 22. By using screws or bolts (not shown) through the mounting holes 22, the mounting flange 16 may be assembled to a wall of a vessel or a pipe (not shown) that carries a fluid to be heated. At least a portion of the heater assemblies 18 are be immersed in the fluid inside the vessel or pipe to heat the fluid in this form of the present disclosure.

Figure 2:
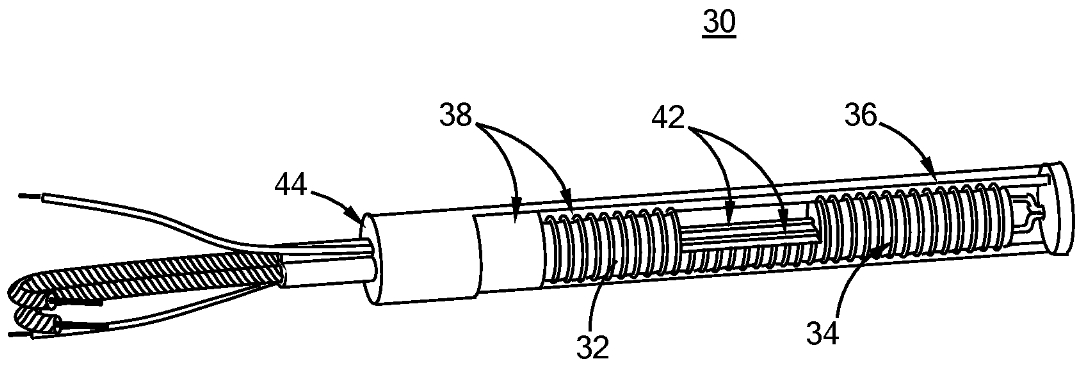
FIG. 2 is a perspective view of a heater assembly of the heater bundle of FIG. 1.

Referring to FIG. 2, the heater assemblies 18 according to one form may be in the form of a cartridge heater 30. The cartridge heater 30 is a tube-shaped heater that generally includes a core body 32, a resistive heating wire 34 wrapped around the core body 32, a metal sheath 36 enclosing the core body 32 and the resistive heating wire 34 therein, and an insulating material 38 filling in the space in the metal sheath 36 to electrically insulate the resistive heating wire 34 from the metal sheath 36 and to thermally conduct the heat from the resistive heating wire 34 to the metal sheath 36. The core body 32 may be made of ceramic. The insulation material 38 may be compacted Magnesium Oxide (MgO). A plurality of power conductors 42 extend through the core body 32 along a longitudinal direction and are electrically connected to the resistive heating wires 34. The power conductors 42 also extend through an end piece 44 that seals the outer sheath 36. The power conductors 42 are connected to the external power supply device 14 (shown in FIG. 1) to supply power from the external power supply device 14 to the resistive heating wire 32. While FIG. 2 shows only two power conductors 42 extending through the end piece 44, more than two power conductors 42 can extend through the end piece 44. The power conductors 42 may be in the form of conductive pins. Various constructions and further structural and electrical details of cartridge heaters are set forth in greater detail in U.S. Pat. Nos. 2,831,951 and 3,970,822, which are commonly assigned with the present application and the contents of which are incorporated herein by reference in their entirety. Therefore, it should be understood that the form illustrated herein is merely exemplary and should not be construed as limiting the scope of the present disclosure.

Alternatively, multiple resistive heating wires 34 and multiple pairs of power conductors 42 may be used to form multiple heating circuits that can be independently controlled to enhance reliability of the cartridge heater 30. Therefore, when one of the resistive heating wires 34 fails, the remaining resistive wires 34 may continue to generate heat without causing the entire cartridge heater 30 to fail and without causing costly machine downtime.

Figure 3:
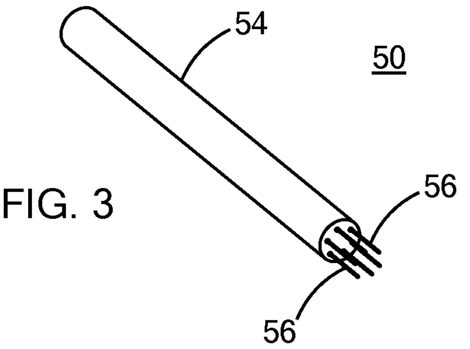
FIG. 3 is a perspective view of a variant of a heater assembly of the heater bundle of FIG. 1.
Figure 4:
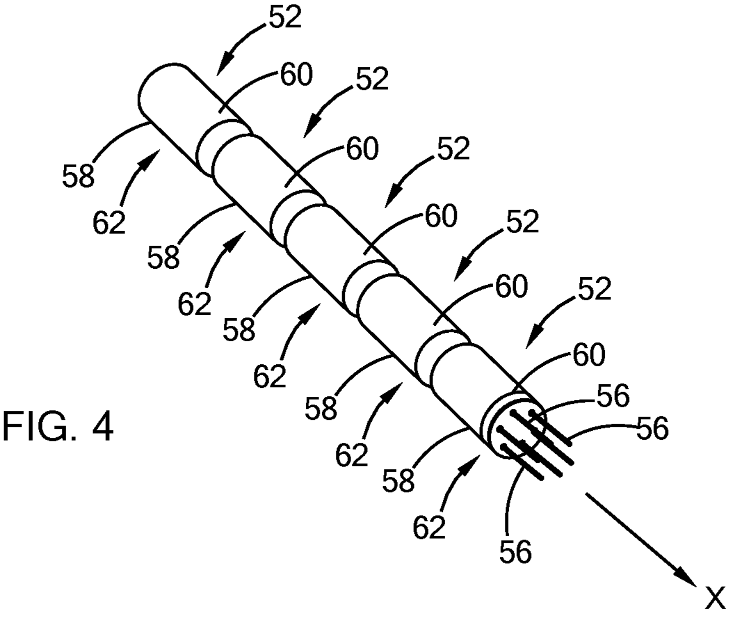
FIG. 4 is a perspective view of the heater assembly of FIG. 3, wherein the outer sheath of the heater assembly is removed for clarity.
Figure 5:
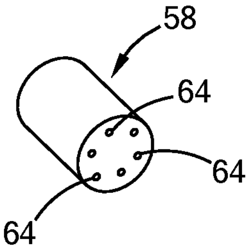
FIG. 5 is a perspective view of a core body of the heater assembly of FIG. 3.

Referring to FIGS. 3 to 5, the heater assemblies 50 may be in the form of a cartridge heater having a configuration similar to that of FIG. 2 except for the number of core bodies and number of power conductors used. More specifically, the heater assemblies 50 each include a plurality of heater units 52, and an outer metal sheath 54 enclosing the plurality of heater units 52 therein, along with a plurality of power conductors 56. An insulating material (not shown in FIGS. 3 to 5) is provided between the plurality of heating units 52 and the outer metal sheath 54 to electrically insulate the heater units 52 from the outer metal sheath 54. The plurality of heater units 52 each include a core body 58 and a resistive heating element 60 surrounding the core body 58. The resistive heating element 60 of each heater unit 52 may define one or more heating circuits to define one or more heating zones 62.

In the present form, each heater unit 52 defines one heating zone 62 and the plurality of heater units 52 in each heater assembly 50 are aligned along a longitudinal direction X. Therefore, each heater assembly 50 defines a plurality of heating zones 62 aligned along the longitudinal direction X. The core body 58 of each heater unit 52 defines a plurality of through holes/apertures 64 to allow power conductors 56 to extend therethrough. The resistive heating elements 60 of the heater units 52 are connected to the power conductors 56, which, in turn, are connected to an external power supply device 14. The power conductors 56 supply the power from the power supply device 14 to the plurality of heater units 50. By properly connecting the power conductors 56 to the resistive heating elements 60, the resistive heating elements 60 of the plurality of heating units 52 can be independently controlled by the controller 15 of the power supply device 14. As such, failure of one resistive heating element 60 for a particular heating zone 62 will not affect the proper functioning of the remaining resistive heating elements 60 for the remaining heating zones 62. Further, the heater units 52 and the heater assemblies 50 may be interchangeable for ease of repair or assembly.

In the present form, six power conductors 56 are used for each heater assembly 50 to supply power to five independent electrical heating circuits on the five heater units 52. Alternatively, six power conductors 56 may be connected to the resistive heating elements 60 in a way to define three fully independent circuits on the five heater units 52. It is possible to have any number of power conductors 56 to form any number of independently controlled heating circuits and independently controlled heating zones 62. For example, seven power conductors 56 may be used to provide six heating zones 62. Eight power conductors 56 may be used to provide seven heating zones 62.

The power conductors 56 may include a plurality of power supply and power return conductors, a plurality of power return conductors and a single power supply conductor, or a plurality of power supply conductors and a single power return conductor. If the number of heater zones is n, the number of power supply and return conductors is n+1.

Alternatively, a higher number of electrically distinct heating zones 62 may be created through multiplexing, polarity sensitive switching and other circuit topologies by the controller 15 of the external power supply device 14. Use of multiplexing or various arrangements of thermal arrays to increase the number of heating zones within the cartridge heater 50 for a given number of power conductors (e.g. a cartridge heater with six power conductors for 15 or 30 zones.) is disclosed in U.S. Pat. Nos. 9,123,755, 9,123,756, 9,177,840, 9,196,513, and their related applications, which are commonly assigned with the present application and the contents of which are incorporated herein by reference in their entirety.

With this structure, each heater assembly 50 includes a plurality of heating zones 62 that can be independently controlled to vary the power output or heat distribution along the length of the heater assembly 50. The heater bundle 12 includes a plurality of such heater assemblies 50. Therefore, the heater bundle 12 provides a plurality of heating zones 62 and a tailored heat distribution for heating the fluid that flows through the heater bundle 12 to be adapted for specific applications. The power supply device 14 can be configured to modulate power to each of the independently controlled heating zones 62.

For example, a heating assembly 50 may define an "m" heating zones, and the heater bundle may include "k" heating assemblies 50. Therefore, the heater bundle 12 may define m×k heating zones. The plurality of heating zones 62 in the heater bundle 12 can be individually and dynamically controlled in response to heating conditions and/or heating requirements, including but not limited to, the life and the reliability of the individual heater units 52, the sizes and costs of the heater units 52, local heater flux, characteristics and operation of the heater units 52, and the entire power output.

Each circuit is individually controlled at a desired temperature or a desired power level so that the distribution of temperature and/or power adapts to variations in system parameters (e.g. manufacturing variation/tolerances, changing environmental conditions, changing inlet flow conditions such as inlet temperature, inlet temperature distribution, flow velocity, velocity distribution, fluid composition, fluid heat capacity, etc.). More specifically, the heater units 52 may not generate the same heat output when operated under the same power level due to manufacturing variations as well as varied degrees of heater degradation over time. The heater units 52 may be independently controlled to adjust the heat output according to a desired heat distribution. The individual manufacturing tolerances of components of the heater system and assembly tolerances of the heater system are increased as a function of the modulated power of the power supply, or in other words, because of the high fidelity of heater control, manufacturing tolerance of individual components need not be as tight/narrow.

The heater units 52 may each include a temperature sensor (not shown) for measuring the temperature of the heater units 52. When a hot spot in the heater units 52 is detected, the power supply device 14 may reduce or turn off the power to the particular heater unit 52 on which the hot spot is detected to avoid overheating or failure of the particular heater unit 52. The power supply device 14 may modulate the power to the heater units 52 adjacent to the disabled heater unit 52 to compensate for the reduced heat output from the particular heater unit 52.

The power supply device 14 may include multi-zone algorithms to turn off or turn down the power level delivered to any particular zone, and to increase the power to the heating zones adjacent to the particular heating zone that is disabled and has a reduced heat output. By carefully modulating the power to each heating zone, the overall reliability of the system can be improved. By detecting the hot spot and controlling the power supply accordingly, the heater system 10 has improved safety.

The heater bundle 12 with the multiple independently controlled heating zones 62 can accomplish improved heating. For example, some circuits on the heater units 52 may be operated at a nominal (or "typical") duty cycle of less than 100% (or at an average power level that is a fraction of the power that would be produced by the heater with line voltage applied). The lower duty cycles allow for the use of resistive heating wires with a larger diameter, thereby improving reliability.

Normally, smaller zones would employ a finer wire size to achieve a given resistance. Variable power control allows a larger wire size to be used, and a lower resistance value can be accommodated, while protecting the heater from overloading with a duty cycle limit tied to the power dissipation capacity of the heater.

The use of a scaling factor may be tied to the capacity of the heater units 52 or the heating zone 62. The multiple heating zones 62 allow for more accurate determination and control of the heater bundle 12. The use of a specific scaling factor for a particular heating circuit/zone will allow for a more aggressive (i.e. higher) temperature (or power level) at almost all zones, which, in turn, lead to a smaller, less costly design for the heater bundle 12. Such a scaling factor and method is disclosed in U.S. Pat. No. 7,257,464, which is commonly assigned with the present application and the contents of which are incorporated herein by reference in its entirety.

The sizes of the heating zones controlled by the individual circuits can be made equal or different to reduce the total number of zones needed to control the distribution of temperature or power to a desired accuracy.

Referring back to FIG. 1, the heater assemblies 18 are shown to be a single end heater, i.e., the conductive pin extends through only one longitudinal end of the heater assemblies 18. The heater assembly 18 may extend through the mounting flange 16 or a bulkhead (not shown) and sealed to the flange 16 or bulkhead. As such, the heater assemblies 18 can be individually removed and replaced without removing the mounting flange 16 from the vessel or tube.

Alternatively, the heater assembly 18 may be a "double ended" heater. In a double-ended heater, the metal sheath are bent into a hairpin shape and the power conductors pass through both longitudinal ends of the metal sheath so that both longitudinal ends of the metal sheath pass through and are sealed to the flange or bulkhead. In this structure, the flange or the bulkhead need to be removed from the housing or the vessel before the individual heater assembly 18 can be replaced.

Figure 6:
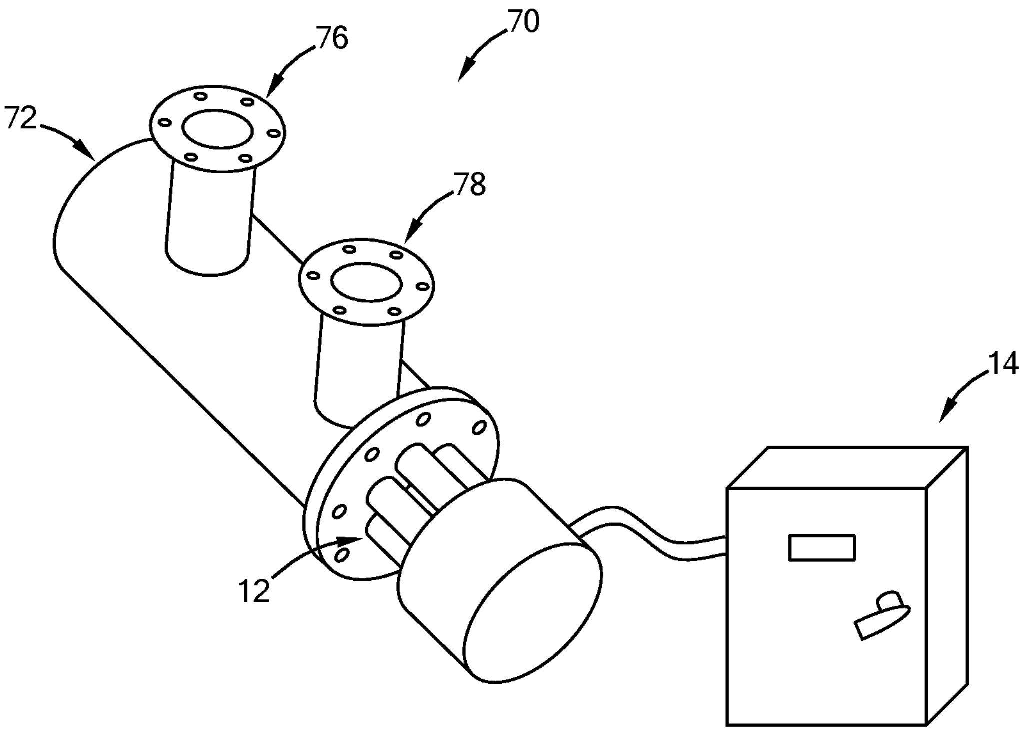
FIG. 6 is a perspective view of a heat exchanger including the heater bundle of FIG. 1, wherein the heater bundle is partially disassembled from the heat exchanger to expose the heater bundle for illustration purposes.

Referring to FIG. 6, a heater bundle 12 is incorporated in a heat exchanger 70. The heat exchanger 70 includes a sealed housing 72 defining an internal chamber (not shown), a heater bundle 12 disposed within the internal chamber of the housing 72. The sealed housing 72 includes a fluid inlet 76 and a fluid outlet 78 through which fluid is directed into and out of the internal chamber of the sealed housing 72. The fluid is heated by the heater bundle 12 disposed in the sealed housing 72. The heater bundle 12 may be arranged for either cross-flow or for flow parallel to their length.

The heater bundle 12 is connected to an external power supply device 14 which may include a means to modulate power, such as a switching means or a variable transformer, to modulate the power supplied to an individual zone. The power modulation may be performed as a function of time or based on detected temperature of each heating zone.

The resistive heating wire may also function as a sensor using the resistance of the resistive wire to measure the temperature of the resistive wire and using the same power conductors to send temperature measurement information to the power supply device 14. A means of sensing temperature for each zone would allow the control of temperature along the length of each heater assembly 18 in the heater bundle 12 (down to the resolution of the individual zone). Therefore, the additional temperature sensing circuits and sensing means can be dispensed with, thereby reducing the manufacturing costs. Direct measurement of the heater circuit temperature is a distinct advantage when trying to maximize heat flux in a given circuit while maintaining a desired reliability level for the system because it eliminates or minimizes many of the measurement errors associated with using a separate sensor. The heating element temperature is the characteristic that has the strongest influence on heater reliability. Using a resistive element to function as both a heater and a sensor is disclosed in U.S. Pat. No. 7,196,295, which is commonly assigned with the present application and the contents of which are incorporated herein by reference in its entirety.

Alternatively, the power conductors 56 may be made of dissimilar metals such that the power conductors 56 of dissimilar metals may create a thermocouple for measuring the temperature of the resistive heating elements. For example, at least one set of a power supply and a power return conductor may include different materials such that a junction is formed between the different materials and a resistive heating element of a heater unit and is used to determine temperature of one or more zones. Use of "integrated" and "highly thermally coupled" sensing, such as using different metals for the heater leads to generation of a thermocouple-like signal. The use of the integrated and coupled power conductors for temperature measurement is disclosed in U.S. application Ser. No. 14/725,537, which is commonly assigned with the present application and the contents of which are incorporated herein by reference in its entirety.

The controller 15 for modulating the electrical power delivered to each zone may be a closed-loop automatic control system. The closed-loop automatic control system 15 receives the temperature feedback from each zone and automatically and dynamically controls the delivery of power to each zone, thereby automatically and dynamically controlling the power distribution and temperature along the length of each heater assembly 18 in the heater bundle 12 without continuous or frequent human monitoring and adjustment.

The heater units 52 as disclosed herein may also be calibrated using a variety of methods including but not limited to energizing and sampling each heater unit 52 to calculate its resistance. The calculated resistance can then be compared to a calibrated resistance to determine a resistance ratio, or a value to then determine actual heater unit temperatures. Exemplary methods are disclosed in U.S. Pat. Nos. 5,280,422 and 5,552,998, which are commonly assigned with the present application and the contents of which are incorporated herein by reference in their entirety.

One form of calibration includes operating the heater system 10 in at least one mode of operation, controlling the heater system 10 to generate a desired temperature for at least one of the independently controlled heating zones 62, collecting and recording data for the at least one independently controlled heating zones 62 for the mode of operation, then accessing the recorded data to determine operating specifications for a heating system having a reduced number of independently controlled heating zones, and then using the heating system with the reduced number of independently controlled heating zones. The data may include, by way of example, power levels and/or temperature information, among other operational data from the heater system 10 having its data collected and recorded.

In a variation of the present disclosure, the heater system may include a single heater assembly 18, rather than a plurality of heater assemblies in a bundle 12. The single heater assembly 18 would comprise a plurality of heater units 52, each heater unit 52 defining at least one independently controlled heating zone. Similarly, power conductors 56 are electrically connected to each of the independently controlled heating zones 62 in each of the heater units 62, and the power supply device is configured to modulate power to each of the independently controlled heater zones 62 of the heater units through the power conductors 56.

Figure 7:
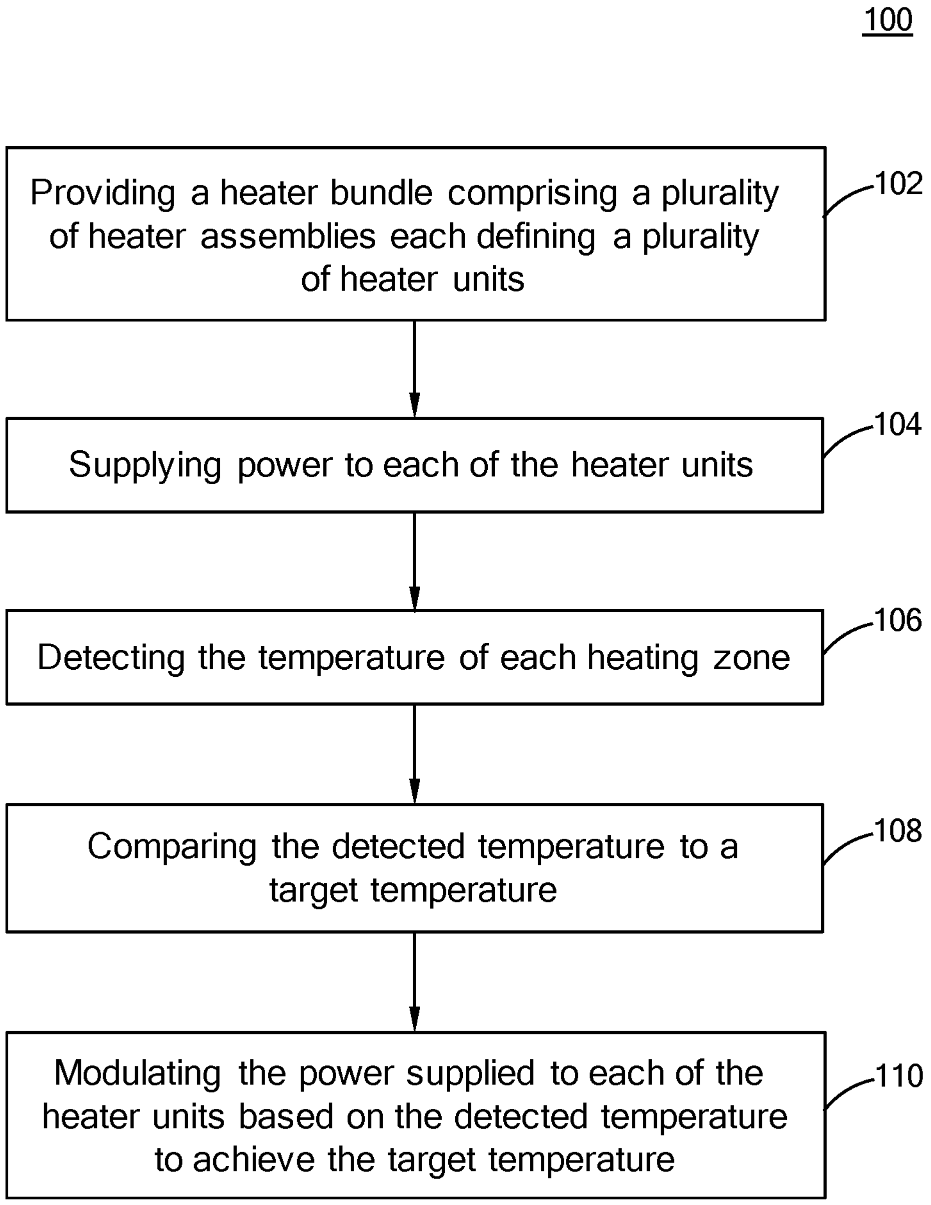
FIG. 7 is a block diagram of a method of operating a heater system including a heater bundle constructed in accordance with the teachings of the present disclosure.

Referring to FIG. 7, a method 100 of controlling a heater system includes providing a heater bundle comprising a plurality of heater assemblies in step 102. Each heater assembly includes a plurality of heater units. Each heater unit defines at least one independently controlled heating circuit (and consequently heating zone). The power to each of the heater units is supplied through power conductors electrically connected to each of the independently controlled heating zones in each of the heater units in step 104. The temperature within each of the zones is detected in step 106. The temperature may be determined using a change in resistance of a resistive heating element of at least one of the heater units. The zone temperature may be initially determined by measuring the zone resistance (or, by measurement of circuit voltage, if appropriate materials are used).

The temperature values may be digitalized. The signals may be communicated to a microprocessor. The measured (detected) temperature values may be compared to a target (desired) temperature for each zone in step 108. The power supplied to each of the heater units may be modulated based on the measured temperature to achieve the target temperatures in step 110.

Optionally, the method may further include using a scaling factor to adjust the modulating power. The scaling factor may be a function of a heating capacity of each heating zone. The controller 15 may include an algorithm, potentially including a scaling factor and/or a mathematical model of the dynamic behavior of the system (including knowledge of the update time of the system), to determine the amount of power to be provided (via duty cycle, phase angle firing, voltage modulation or similar techniques) to each zone until the next update. The desired power may be converted to a signal, which is sent to a switch or other power modulating device for controlling power output to the individual heating zones.

In the present form, when at least one heating zone is turned off due to an anomalous condition, the remaining zones continue to provide a desired wattage without failure. Power is modulated to a functional heating zone to provide a desired wattage when an anomalous condition is detected in at least one heating zone. When at least one heating zone is turned off based on the determined temperature, the remaining zones continue to provide a desired wattage. The power is modulated to each of the heating zones as a function of at least one of received signals, a model, and as a function of time.

For safety or process control reasons, typical heaters are generally operated to be below a maximum allowable temperature in order to prevent a particular location of the heater from exceeding a given temperature due to unwanted chemical or physical reactions at the particular location, such as combustion/fire/oxidation, coking boiling etc.). Therefore, this is normally accommodated by a conservative heater design (e.g., large heaters with low power density and much of their surface area loaded with a much lower heat flux than might otherwise be possible).

However, with the heater bundle of the present disclosure, it is possible to measure and limit the temperature of any location within the heater down to a resolution on the order of the size of the individual heating zones. A hot spot large enough to influence the temperature of an individual circuit can be detected.

Since the temperature of the individual heating zones can be automatically adjusted and consequently limited, the dynamic and automatic limitation of temperature in each zone will maintain this zone and all other zones to be operating at an optimum power/heat flux level without fear of exceeding the desired temperature limit in any zone. This brings an advantage in high-limit temperature measurement accuracy over the current practice of clamping a separate thermocouple to the sheath of one of the elements in a bundle. The reduced margin and the ability to modulate the power to individual zones can be selectively applied to the heating zones, selectively and individually, rather than applied to an entire heater assembly, thereby reducing the risk of exceeding a predetermined temperature limit.

The characteristics of the cartridge heater may vary with time. This time varying characteristic would otherwise require that the cartridge heater be designed for a single selected (worse-case) flow regime and therefore that the cartridge heater would operate at a sub-optimum state for other states of flow.

However, with dynamic control of the power distribution over the entire bundle down to a resolution of the core size due to the multiple heating units provided in the heater assembly, an optimized power distribution for various states of flow can be achieved, as opposed to only one power distribution corresponding to only one flow state in the typical cartridge heater. Therefore, the heater bundle of the present application allows for an increase in the total heat flux for all other states of flow.

Further, variable power control can increase heater design flexibility. The voltage can be de-coupled from resistance (to a great degree) in heater design and the heaters may be designed with the maximum wire diameter that can be fitted into the heater. It allows for increased capacity for power dissipation for a given heater size and level of reliability (or life of the heater) and allows for the size of the bundle to be decreased for a given overall power level. Power in this arrangement can be modulated by a variable duty cycle that is a part of the variable wattage controllers currently available or under development. The heater bundle can be protected by a programmable (or pre-programmed if desired) limit to the duty cycle for a given zone to prevent "overloading" the heater bundle.

In still another form of the present disclosure, a method and apparatus to reduce current leakage is provided. One method of controlling a heating system comprises providing at least one heater assembly, the heater assembly comprising a plurality of heater units, each heater unit defining at least one independently controlled heating zone as set forth above. Power is supplied to each of the heater units through power conductors electrically connected to each of the independently controlled heating zones in each of the heater units, and the power supplied is modulated to each of the independently controlled heating zones. In order to reduce current leakage, a voltage from the power supply is selectively supplied to each of the independently controlled heating zones such that a reduced number of independently controlled heating zones receives the voltage at a time, or at least a portion (or a subset) of the independently controlled heating zones receive a reduced voltage at all times. In one example, the voltage may be selectively supplied by a variable transformer.

The independently controlled zones can be switched in sequence thus limiting the number of zones (and the cross-sectional area of electrical insulation that is exposed to electrical potential). By limiting the number of zones (and the area) subjected to the electrical potential at any given time to a fraction of the total number of zones, we can reduce the current leakage by a similar fraction. For example, if the zones in a heater bundle are divided into four groups (not necessarily geometrically contiguous) and if each of these groups covered approximately ¼ of the total area of the heater, and further, if the switching scheme is configured so that no more than one of the four zones is powered on at any given instant in time, then the overall leakage current from the heater can be reduced by a factor of 4 (to 25% of its original value).

In order to accomplish the selective supply of voltage, in one form a scaling factor is employed. The scaling factor may be employed according to the teachings of U.S. Pat. No. 7,257,464, which is commonly assigned with the present application and the entire contents of which are incorporated herein by reference in their entirety. The scaling factor may be employed for at least one of adjusting the modulating power, determining a magnitude of the voltage to be selectively supplied, and determining a duration for which the voltage is selectively supplied.

Further, the scaling factor may be a function of operational characteristics of the heating system. For example, the scaling factor can be a function of power dissipation capacity of at least one independently controlled heating zone, a maximum allowable temperature of at least one independently controlled heating zone, an exposed heating area of at least one independently controlled heating zone, a thermal behavior model of the heating system, characteristics of an environmental system producing fluid flow being heated by the heater system, a fluid flow rate across the heater assembly, an area of at least one independently controlled heating zone, electrical insulation resistance of at least one independently controlled heating zone, an electrical current leakage of at least one independently controlled heating zone, a circuit resistance of at least one independently controlled heating zone, a zone circuit EMF of at least one independently controlled heating zone, and a dielectric constant of at least one independently controlled heating zone, among others.

In another form, the scaling factor is a power limiting function that limits a value that is one of wattage, magnitude of voltage selectively supplied, and duration for which the voltage is selectively supplied provided to each heating zone to multiple values less than that produced at a full line voltage through the use of a scaling function, the scaling function being a ratio between a desired value and the value full line voltage, wherein a power controller provides a scaled output by multiplying the percentage output by the scaling function.

The order and/or location of the independently controlled heating zones to which the voltage is sequentially supplied may be any of a variety depending on application requirements. For example, voltage may be sequentially supplied around a periphery or around edges of a heater first before being next supplied to other geometric areas of independently controlled heating zones. Further, the voltage may be sequentially supplied to different heating zones based on a change in resistance of each heating zone.

In another form, at least one heating zone is turned off based on an anomalous condition, while remaining zones continue to receive voltage selectively.

In still another form, a rate of successively supplying the voltage to each of the heating zones is adjusted based on at least one operational characteristic of at least one heating zone. The operational characteristics may be, by way of example, resistance, temperature, and change in resistance over time of at least one heating zone, a fluid flow rate across the heater assembly, an area of an independently controlled heating zone, electrical insulation resistance of at least one independently controlled heating zone, an electrical current leakage of at least one independently controlled heating zone, a circuit resistance of at least one independently controlled heating zone, a zone circuit EMF of at least one independently controlled heating zone, a dielectric constant of at least one independently controlled heating zone, and characteristics of an environmental system producing fluid flow being heated by the heater system.

The methods according to this form of the present disclosure that reduces leakage current may also be applied to at least one heater assembly, the heater assembly comprising a plurality of heater units, each heater unit defining at least one independently controlled heating zone. The methods can be employed with any of the embodiments of heaters and heater systems disclosed herein while remaining within the scope of the present disclosure.

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

The description of the disclosure is merely exemplary in nature and, thus, variations that do not depart from the substance of the disclosure are intended to be within the scope of the disclosure. Such variations are not to be regarded as a departure from the spirit and scope of the disclosure. Furthermore, various omissions, substitutions, combinations, and changes in the forms of the systems, apparatuses, and methods described herein may be made without departing from the spirit and scope of the disclosure even if said omissions, substitutions, combinations, and changes are not explicitly described or illustrated in the figures of the disclosure.

What is claimed is:

1. A heater system comprising:

a heater bundle comprising:

a plurality of heater assemblies, each heater assembly comprising a plurality of heater units and an insulating material, each heater unit defining at least one independently controlled heating zone; and power conductors electrically connected to each of the independently controlled heating zones in each of the heater units; and a power supply device configured to modulate power to each of the independently controlled heater zones of the heater units through the power conductors, wherein a voltage is selectively and sequentially supplied to each of the independently controlled heating zones at a rate based on at least one operational characteristic of at least one of the heating zones such that a reduced number of independently controlled heating zones receives the voltage at a time or at least a subset of the independently controlled heating zones receive a reduced voltage at all times to reduce leakage current through the insulating material.

2. The heater system according to claim 1, wherein the voltage is selectively supplied via a variable transformer.

3. The heater system according to claim 1, wherein at least one set of a power supply and a power return conductors comprise different materials such that a junction is formed between the different materials and a resistive heating element of a heater unit and is used to determine temperature of the independently controlled heating zones.

4. The heater system according to claim 1, wherein a number of independently controlled heating zones is n, and a number of power supply and return conductors is n+1.

5. An apparatus for heating fluid comprising:

a sealed housing defining an internal chamber and having a fluid inlet and a fluid outlet; and the heater bundle according to claim 1 disposed within the internal chamber of the sealed housing, wherein the heater bundle is adapted to provide a tailored heat distribution to a fluid within the sealed housing.

6. The heater system according to claim 1, wherein the power supply device is configured to use a scaling factor for at least one of adjusting the modulating power, determining a magnitude of the voltage to be selectively supplied, and determining a duration for which the voltage is selectively supplied.

7. The heater system according to claim 6, wherein the power supply device is configured to use the scaling factor as a function of at least one of a power dissipation capacity of at least one independently controlled heating zone, a maximum allowable temperature of at least one independently controlled heating zone, an exposed heating area of at least one independently controlled heating zone, a thermal behavior model of the heating system, characteristics of an environmental system producing fluid flow being heated by the heater system, a fluid flow rate across the heater assembly, an area of at least one independently controlled heating zone, electrical insulation resistance of at least one independently controlled heating zone, an electrical current leakage of at least one independently controlled heating zone, a circuit resistance of at least one independently controlled heating zone, a zone circuit EMF of at least one independently controlled heating zone, and a dielectric constant of at least one independently controlled heating zone.

8. The heater system according to claim 6, wherein the scaling factor is a power limiting function that limits a value that is one of wattage, magnitude of voltage selectively supplied, and duration for which the voltage is selectively supplied to each heating zone to multiple values less than that produced at a full line voltage through the use of a scaling function, the scaling function being a ratio between a desired value and the full line voltage, wherein the power supply device is configured to provide a scaled output by multiplying a percentage output by the scaling function.

9. The heater system according to claim 1, wherein the power supply device is configured to sequentially supply the voltage to predetermined geometric areas of the independently controlled heating zones.

10. The heater system according to claim 1, wherein the power supply device is configured to sequentially supply the voltage to different heating zones based on a change in resistance of each heating zone.

11. The heater system according to claim 1, wherein the power supply device is configured to turn off at least one independently controlled heating zone based on an anomalous condition, while the remaining independently controlled heating zones continue to receive the voltage selectively.

12. The heater system according to claim 1, wherein the power supply device is configured to adjust a rate of successively supplying the voltage to each of the independently controlled heating zones based on an operational characteristic of at least one independently controlled heating zone.

13. The heater system according to claim 12, wherein the operational characteristic is one of resistance, temperature, and change in resistance over time of at least one heating zone, a fluid flow rate across the heater assembly, an area of an independently controlled heating zone, electrical insulation resistance of at least one independently controlled heating zone, an electrical current leakage of at least one independently controlled heating zone, a circuit resistance of at least one independently controlled heating zone, a zone circuit EMF of at least one independently controlled heating zone, a dielectric constant of at least one independently controlled heating zone, and characteristics of an environmental system producing fluid flow being heated by the heater system.

14. A heater system comprising:

a heater assembly comprising a plurality of heater units, each heater unit defining at least one independently controlled heating zone and an insulating material;

power conductors electrically connected to each of the independently controlled heating zones in each of the heater units; and a power supply device configured to modulate power to each of the independently controlled heater zones of the heater units through the power conductors, wherein a voltage is selectively and sequentially supplied to each of the independently controlled heating zones at a rate based on at least one operational characteristic of at least one of the heating zones such that a reduced number of independently controlled heating zones receives the voltage at a time or at least a subset of the independently controlled heating zones receive a reduced voltage at all times to reduce leakage current through the insulating material.

15. The heater system according to claim 14, wherein the voltage is selectively supplied via a variable transformer.

16. The heater system according to claim 14, wherein at least one set of a power supply and a power return conductors comprise different materials such that a junction is formed between the different materials and a resistive heating element of a heater unit and is used to determine temperature of the independently controlled heating zones.

17. The heater system according to claim 14, wherein a number of independently controlled heating zones is n, and a number of power supply and return conductors is n+1.

18. The heater system according to claim 14, wherein the power supply device is configured to use a scaling factor for at least one of adjusting the modulating power, determining a magnitude of the voltage to be selectively supplied, and determining a duration for which the voltage is selectively supplied.

19. The heater system according to claim 18, wherein the power supply device is configured to use the scaling factor as a function of at least one of a power dissipation capacity of at least one independently controlled heating zone, a maximum allowable temperature of at least one independently controlled heating zone, an exposed heating area of at least one independently controlled heating zone, a thermal behavior model of the heating system, characteristics of an environmental system producing fluid flow being heated by the heater system, a fluid flow rate across the heater assembly, an area of at least one independently controlled heating zone, electrical insulation resistance of at least one independently controlled heating zone, an electrical current leakage of at least one independently controlled heating zone, a circuit resistance of at least one independently controlled heating zone, a zone circuit EMF of at least one independently controlled heating zone, and a dielectric constant of at least one independently controlled heating zone.

20. The heater system according to claim 18, wherein the scaling factor is a power limiting function that limits a value that is one of wattage, magnitude of voltage selectively supplied, and duration for which the voltage is selectively supplied to each heating zone to multiple values less than that produced at a full line voltage through the use of a scaling function, the scaling function being a ratio between a desired value and the full line voltage, wherein the power supply device is configured to provide a scaled output by multiplying a percentage output by the scaling function.

21. The heater system according to claim 14, wherein the power supply device is configured to sequentially supply the voltage to predetermined geometric areas of the independently controlled heating zones.

22. The heater system according to claim 14, wherein the power supply device is configured to sequentially supply the voltage to different heating zones based on a change in resistance of each heating zone.

23. The heater system according to claim 14, wherein the power supply device is configured to turn off at least one independently controlled heating zone based on an anomalous condition, while the remaining independently controlled heating zones continue to receive the voltage selectively.

24. The heater system according to claim 14, wherein the power supply device is configured to adjust a rate of successively supplying the voltage to each of the independently controlled heating zones based on an operational characteristic of at least one independently controlled heating zone.

25. The heater system according to claim 24, wherein the operational characteristic is one of resistance, temperature, and change in resistance over time of at least one heating zone, a fluid flow rate across the heater assembly, an area of an independently controlled heating zone, electrical insulation resistance of at least one independently controlled heating zone, an electrical current leakage of at least one independently controlled heating zone, a circuit resistance of at least one independently controlled heating zone, a zone circuit EMF of at least one independently controlled heating zone, a dielectric constant of at least one independently controlled heating zone, and characteristics of an environmental system producing fluid flow being heated by the heater system.

* * * * *